(12) United States Patent
Greene

(10) Patent No.: US 8,751,659 B2
(45) Date of Patent: Jun. 10, 2014

(54) DATA CENTER BATCH JOB QUALITY OF SERVICE CONTROL

(75) Inventor: Daniel H. Greene, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/463,709

(22) Filed: May 3, 2012

(65) Prior Publication Data

US 2012/0221733 A1  Aug. 30, 2012

Related U.S. Application Data

(63) Continuation of application No. 12/474,194, filed on May 28, 2009.

(51) Int. Cl.
  *G06F 15/173* (2006.01)
  *H04L 12/56* (2006.01)
  *H04L 12/24* (2006.01)
  *H04L 12/26* (2006.01)

(52) U.S. Cl.
  CPC ............ *H04L 47/822* (2013.01); *H04L 47/823* (2013.01); *H04L 47/821* (2013.01); *H04L 47/805* (2013.01); *H04L 41/5016* (2013.01); *H04L 41/5012* (2013.01); *H04L 41/5035* (2013.01); *H04L 12/2634* (2013.01)
  USPC ............................ 709/226; 709/223; 709/225

(58) Field of Classification Search
  CPC ... H04L 47/823; H04L 47/805; H04L 47/821; H04L 47/822; H04L 41/5016; H04L 41/5012; H04L 41/5035; H04L 12/2634
  USPC .......................... 708/223–226; 709/223–226
  See application file for complete search history.

(56) References Cited

U.S. PATENT DOCUMENTS

| | | | |
|---|---|---|---|
| 6,205,150 B1 | 3/2001 | Ruszczyk | |
| 6,404,738 B1 * | 6/2002 | Reininger et al. | 370/236 |
| 6,516,350 B1 * | 2/2003 | Lumelsky et al. | 709/226 |
| 7,356,770 B1 | 4/2008 | Jackson | |
| 7,925,757 B1 | 4/2011 | Rolia et al. | |
| 8,014,273 B1 * | 9/2011 | Barrett et al. | 370/210 |
| 2005/0021349 A1 | 1/2005 | Cheliotis et al. | |
| 2005/0058149 A1 | 3/2005 | Howe | |
| 2005/0086335 A1 * | 4/2005 | Liu et al. | 709/223 |
| 2006/0218285 A1 * | 9/2006 | Talwar et al. | 709/227 |
| 2006/0288251 A1 | 12/2006 | Jackson | |
| 2007/0206615 A1 * | 9/2007 | Plamondon et al. | 370/401 |
| 2007/0234363 A1 | 10/2007 | Ferrandiz | |
| 2007/0240161 A1 * | 10/2007 | Prabhakar et al. | 718/104 |
| 2007/0260669 A1 | 11/2007 | Neiman et al. | |
| 2007/0297415 A1 | 12/2007 | Lee et al. | |

(Continued)

*Primary Examiner* — Hieu Hoang
(74) *Attorney, Agent, or Firm* — Marger Johnson & McCollom PC

(57) ABSTRACT

A data center management system can include a data center customer profile corresponding to a data center customer, where the data center customer profile includes a service level agreement (SLA) and a data center resource usage model. A batch job quality of service (QoS) control module can determine an immediate QoS specification for a batch job of the data center customer, and a data center resource optimization module can determine a data center resource allocation for the data center customer based on the data center customer profile and the immediate QoS specification.

13 Claims, 5 Drawing Sheets

(56) References Cited

U.S. PATENT DOCUMENTS

| | | |
|---|---|---|
| 2008/0052718 A1 | 2/2008 | Hundscheidt |
| 2008/0168452 A1 | 7/2008 | Molaro et al. |
| 2008/0192632 A1 | 8/2008 | Bader |
| 2008/0215409 A1 | 9/2008 | Van Matre |
| 2008/0295029 A1 | 11/2008 | Dettinger et al. |
| 2009/0007123 A1 | 1/2009 | Sreedharan et al. |
| 2009/0245213 A1 | 10/2009 | Zaki et al. |
| 2009/0280849 A1 | 11/2009 | Rosen et al. |
| 2010/0034185 A1 | 2/2010 | De Bruin et al. |
| 2010/0131957 A1 | 5/2010 | Kami |
| 2010/0260153 A1 | 10/2010 | Hollick et al. |
| 2010/0299433 A1 | 11/2010 | De Boer et al. |
| 2011/0125698 A1 | 5/2011 | Rome et al. |

* cited by examiner

DATA CENTER BATCH JOB QUALITY OF SERVICE CONTROL

CROSS-REFERENCE TO RELATED APPLICATION

This is a Continuation of co-pending U.S. patent application Ser. No. 12/474,194, filed May 28, 2009, entitled DATA CENTER BATCH JOB QUALITY OF SERVICE CONTROL, the disclosure of which is herein incorporated by reference in its entirety.

TECHNICAL FIELD

The disclosed technology relates to the field of data centers and, more particularly, to various techniques pertaining to determining data center resource allocations for batch jobs that can be implemented in connection with data center operations.

BACKGROUND

Data centers are frequently used by various types of entities for a wide variety of purposes. Service providers such as phone companies, cable networks, power companies, retailers, etc., commonly store and access their customers' data in 'server farms,' or data centers. For purposes of the present specification, 'data center' refers to a facility used to house computer systems and associated components, such as telecommunications and storage systems. A data center generally includes not only the computer systems, but also back-up power supplies, redundant data communications connections, environmental controls such as air conditioning and fire suppression, security systems and devices, etc.

Data center operations generally revolve around customer service levels. For example, a particular customer may desire to have a defined quality of service for that customer's computations or data communications. The quality of service may have different requirements for different customers. For example, for one customer, the key measure of the quality of service may involve how fast an application responds when accessed remotely. For another customer, the quality of service may involve the speed or bandwidth of connections provided to that customer's subscriber.

A data center may commit to provide a particular service level for a given customer in the form of a formally negotiated service level agreement (SLA). An SLA typically specifies levels of availability, serviceability, performance, operation, billing, etc., and may even specify penalties in the event of violations of the SLA. SLAs commonly address performance measurement, problem management, customer duties, warranties, disaster recovery, and termination of agreement. For example, an SLA may demand that a particular job get a certain amount of resources with a specified probability. The SLA may also specify a limit on the amount of resources to be assigned to a certain job or group of jobs.

'Virtualization' generally refers to a technique for hiding physical characteristics of computing resources from the way in which other systems, applications, or end users interact with those resources. This typically includes making a single physical resource (e.g., a server, operating system, application, storage device, etc.) appear to function as multiple logical resources. Virtualization may also include making multiple physical resources appear as a single logical resource. In addition, it may include making one physical resource appear, with somewhat different characteristics, as one logical resource.

Virtualization can essentially let one computer do the job of multiple computers, by sharing the resources of a single computer across multiple environments. Virtual machines (e.g., virtual servers and virtual desktops) can provides users with the ability to host multiple operating systems and multiple applications both locally and in remote locations, freeing users from physical and geographical limitations. In addition to energy savings and lower capital expenses due to more efficient use of hardware resources, users can get a high availability of resources, better desktop management, increased security, and improved disaster recovery processes.

Virtual machines serve a wide variety of purposes in a given computer system. For example, virtual machines may be used to provide multiple users with simultaneous access to the computer system. Each user may execute applications in a different virtual machine, and the virtual machines may be scheduled for execution on the computer system hardware. Virtual machines may be used to consolidate tasks that were previously running on separate computer systems, for example, by assigning each task to a virtual machine and running the virtual machines on fewer computer systems. Virtual machines may also be used to provide increased availability. If the computer system fails, for example, tasks that were executing in virtual machines on the computer system may be transferred to similar virtual machines on another computer system.

Using virtual servers enables the migration of processing tasks to other physical servers or resources transparently to the consumers of the services provided by the virtual server, where the consumer may be a user, a process, another computer, etc. A 'consumer' is typically any entity that uses a process or service within the power control system. This is contrasted with a 'customer' which is an identified entity to which the data center provides services according to a service level agreement. Performance levels are generally tracked by customers.

A virtual server differs greatly from a physical server. A virtual server typically appears to be a single server to entities accessing it, while it may actually be a partition or subset of a physical server. It may also appear as a single server but actually be comprised of several physical servers. A virtual server is created through a virtualization process, as discussed above.

Thus, in a given data center, virtualization allows multiple virtual machines (e.g., virtual servers) to share the physical resources (e.g., CPU, memory, disk, and networking resources) of the same physical machine(s) in the data center. Each virtual machine typically has a corresponding specification of resource requirements that determines how much of the physical resources should be reserved for the given virtual machine.

DETAILED DESCRIPTION

Figure 1:
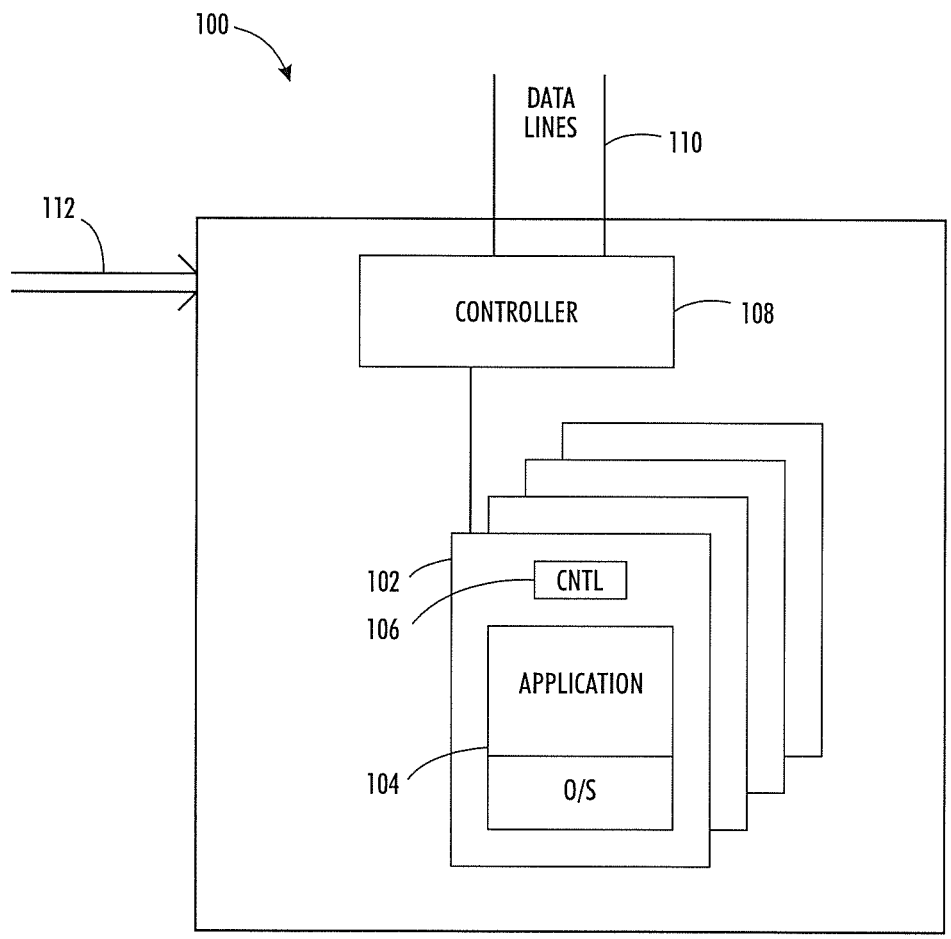
FIG. 1 illustrates an example of a data center architecture having a controller and multiple physical devices, each having a virtual machine, in accordance with embodiments of the disclosed technology.

FIG. 1 illustrates an example of a data center architecture 100 in accordance with embodiments of the disclosed technology. In the example, the data center architecture 100 includes multiple physical devices 102 (e.g., servers). Each physical device 102 is an actual machine, such as a quad-, dual- or single-core computing system, that is able to provide a particular service. Examples of such physical devices 102 commonly include communications servers, database servers, applications servers, etc. Each physical device 102 is depicted as having at least one virtual machine 104 (e.g., a virtual server) operating on it. In the example, the virtual machine 104 includes an application running on top of an operating system.

In the example, the virtual machine 104 allows a low-level module 108 (e.g., a service/power controller) to task the physical devices 102 with processing tasks in virtual machines based in part on the resource needs of the virtual machines and the resource of the physical devices 102. The low-level module 108 may be referred to as a controller or scheduler. The controller 108 can schedule the processing of virtual machines, or the controller 108 can schedule individual tasks to be performed within virtual machines. As used herein, the term "job" generally refers to the virtual machine or task being scheduled.

In the example, the controller 108 is shown as being a single controller, though one having ordinary skill in the art will recognize that the controller 108 may actually be distributed across several computers, processing cores, etc. The controller 108 can migrate jobs between the physical devices 102 and adjust the power consumption of the physical devices 102. In addition to the central controller 108, one or more of the individual physical devices 102 may have a local controller 106. While the physical devices 102 illustrated in the example are servers, other types of devices may be included, such as power supplies, storage arrays or other types of storage, tape decks, etc.

The centralized controller 108 may be coupled to data lines 110. The functions of the data center generally revolve around data processing of some sort, and the controller may merely exist in the same power distribution structure as the data lines, or the power controller may monitor or affect the operation of the data lines. Similarly, the power controller may merely exist in the same power structure as the power lines 112, or the controller 108 may take a more active role with the power lines 112. The power lines 112 come in from "the grid" (i.e., the local power infrastructure that generally includes transmission lines, converters, transformers, and power switches).

Figure 2:
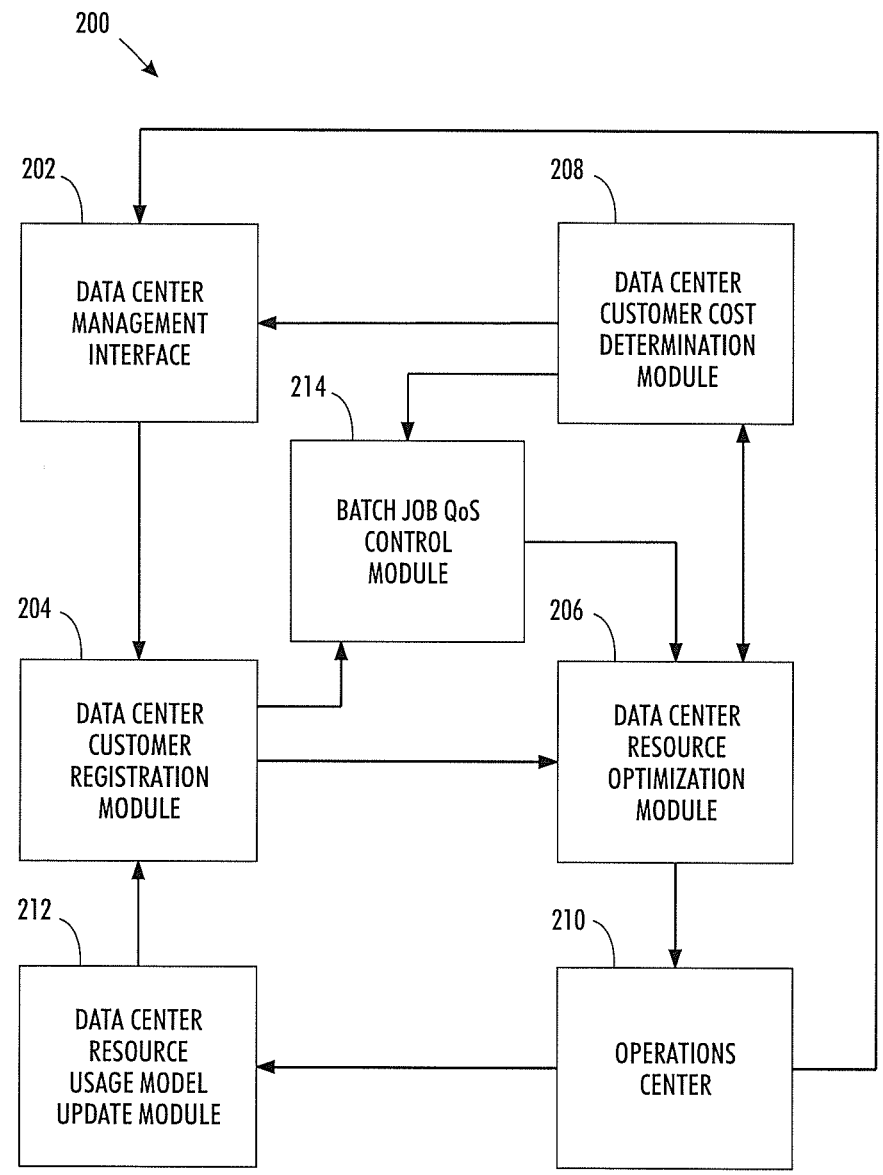
FIG. 2 illustrates an example of a data center optimization system having a data center management interface, a customer registration module, a batch job QoS control module, a resource optimization module, a customer cost determination module, an operations center, and a resource usage model update module.

FIG. 2 illustrates an example of a data center optimization system 200 in accordance with embodiments of the disclosed technology. In the example, the data center optimization system 200 includes a data center management interface 202, a data center customer registration module 204, a data center resource optimization module 206, and a data center customer cost determination module 208. The data center optimization system 200 also includes an operations center 210 (e.g., a group of physical devices such as physical devices 102 of FIG. 1), and a data center resource usage model update module 212. In the example, the data center optimization system 200 also includes a batch job QoS control module 214.

In the example, the data center customer registration module 204 can be used to register each new data center customer by facilitating execution of a data center customer-specific service level agreement (SLA) with the data center and establishing a data center resource usage model (e.g., a quantification of the data center's resources requested by the customer) for the customer. For example, the data center customer registration module 204 can query the data center customer as to how much of each particular data center resource (e.g., memory, disk space, and CPU bandwidth) the customer would like to request. The data center optimization system 200 can then create a data center customer profile for the customer and store both the SLA and the data center resource usage model for the customer as part of the data center customer profile.

In a shared resource system (such as the data center architecture 100 illustrated in FIG. 1, for example), it is possible to serve multiple jobs with the same data center resources by carefully managing the use of the data center resources according to quality of service specifications. For example, techniques for statistically packing multiple jobs (or virtual machines) into a data center resource pool can be implemented where such techniques involve the use of quality of service specifications (e.g., specifications that specify a tolerated risk that the jobs will not receive the resources they need). Examples of these techniques are described in co-pending U.S. patent application Ser. No. 12/253,111, titled "STATISTICAL PACKING OF RESOURCE REQUIREMENTS IN DATA CENTERS," and filed on Oct. 16, 2008, which application is fully incorporated herein by reference. Such techniques can save considerable data center resources when jobs have a diversity of quality of service specifications. In particular, the more risk-tolerant jobs can share the data center resource reservations of the more risk-averse jobs that would otherwise be wasted as contingent reserve.

In the example, the data center resource optimization module 206 can determine an initial (e.g., optimal) data center resource allocation for a given customer (e.g., based on the customer's SLA and data center resource usage model) and then assign the data center resource allocation to the operations center 210 (e.g., a group of data center servers) for execution. In determining the data center resource allocation, the data center resource optimization module 206 can interact with the data center customer cost determination module 208, which can determine (e.g., estimate) the cost to the data center of servicing (e.g., providing resources such as memory and processing) to the particular customer. In certain embodiments, the data center resource optimization module 206 can send a request to the data center customer cost determination module 208 for a determination of the data center customer cost for a particular data center customer or group of data center customers.

Once the customer cost determination module 208 determines a data center customer cost for the customer or group, the data center customer cost determination module 208 can provide the data center customer cost to the data center resource optimization module 206. The data center resource optimization module 206 can then generate the data center resource allocation based on the data center customer cost and assign the data center resource allocation to the operations center 210 for execution.

The data center resource usage model update module 212 can monitor the operations center 210. Based on the monitoring of the operations center 210, the data center resource usage model update module 212 can provide recommendations to the data center customer registration module 204. For example, the data center resource usage model update module 212 can recommend that the data center customer registration module 204 revise the data center customer profile for a particular customer given the customer's usage of the operations center 210 over a certain period of time. In alternative embodiments, the data center resource usage model update module 212 can either revise the data center customer profile directly or provide a newly created data center customer profile to replace the existing data center customer profile for the customer.

The batch quality of service (QoS) control module 214 can be used for batch jobs, which tend to have a rather unique attribute in that they tend to require completion by a specified time rather than a particular priority of scheduling and of service during execution. In situations that involve data center resource allocations for batch jobs, data center resource reservations can be made on each time slice but the requests can be relaxed considerably. That is, batch jobs are generally flexible jobs that have low quality requirements on a per-time-slice basis but expect that, by the end of the time slices, the jobs will be done with a high probability.

The batch job QoS control module 214 can implement the techniques described herein to effectively guarantee successful completion times for batch jobs (e.g., by meeting stochastic resource requirement or deadline completion specifications) while optimizing data center resources in a mix of higher-priority tasks. Such techniques can involve the integration of batch jobs in a QoS shared resource system such that they become short-term risk tolerant and, consequently, reduce the level of data center resources required by the batch jobs while, at the same time, enabling the batch jobs to meet long-term objectives, such as deadlines, with high QoS specifications.

Certain embodiments include the implementation of a control algorithm for batch jobs that is based on QoS specifications. The control algorithm can be used to drive a manipulation of "immediate" QoS specifications that are provided to a statistical packing algorithm in order to achieve "extended interval" QoS specifications that are more natural for batch jobs. In certain embodiments, data center customer cost feedback from the implementation of the statistical packing algorithm can provide a linking of the two optimization algorithms, as illustrated in FIG. 2 (i.e., the batch job QoS control module 214 receives feedback from the data center customer cost determination module 208).

Figure 3:
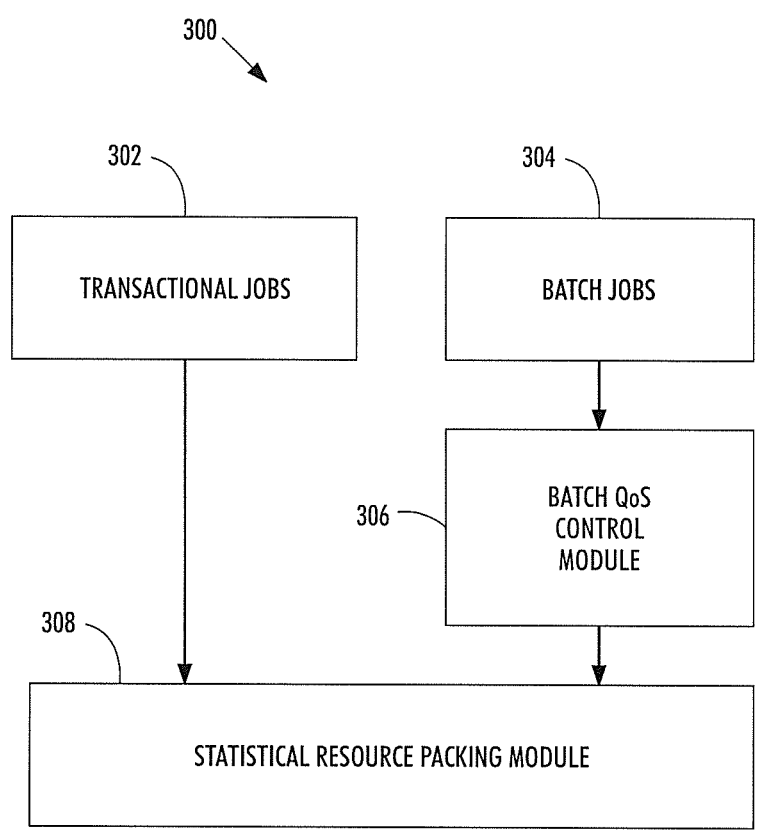
FIG. 3 illustrates an example of a sub-system of a data center optimization system (such as the data center optimization system of FIG. 2) that is suitable for use with transactional jobs and batch jobs, both of which are handled by a statistical resource packing module.

Embodiments of the disclosed technology effectively introduce a layer into the data center architecture that separates the batch job QoS concerns from the data center resource optimization components (e.g., implementations of the statistical packing algorithm), as illustrated in FIG. 3, which shows an example of a sub-system 300 of a data center optimization system (such as the data center optimization system 200 of FIG. 2) that is suitable for use with transactional jobs 302 as well as with batch jobs 304, both of which are handled by a statistical resource packing module 308. The batch jobs 304, however, are first handled by a batch job QoS control algorithm as implemented by a batch job QoS control module 306.

In certain embodiments, the batch job QoS control algorithm can take a batch job's "extended interval" QoS specification, along with the job's resource model for the extended interval, and adaptively produce a series of "immediate" QoS specifications for the batch job to be applied to individual time slices. These "immediate" QoS specifications will typically be far more flexible than the "extended interval" QoS and will thus facilitate effective statistical packing. The layer introduced into the architecture of the system advantageously frees the statistical packing algorithm from needing to directly optimize the "extended interval" QoS specifications; rather, there is now a higher level layer of control that translates these "extended interval" QoS specifications into "immediate" QoS specifications, which significantly simplifies the input to [and operation of] the implementation of the statistical packing algorithm.

Figure 4:
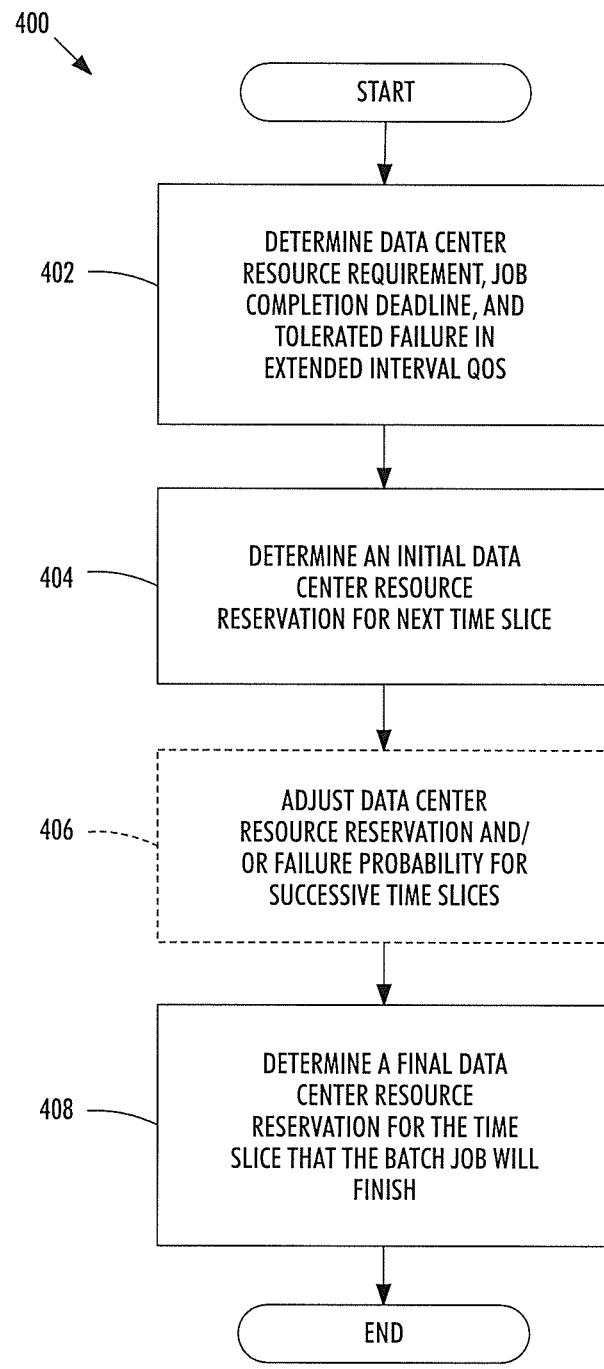
FIG. 4 is a flowchart illustrating an example of a method involving the implementation of a batch job QoS control algorithm (e.g., via a batch QoS control module) in accordance with embodiments of the disclosed technology.

FIG. 4 is a flowchart illustrating an example of a method 400 involving the implementation of a batch job QoS control algorithm (e.g., via a batch job QoS control module) in accordance with embodiments of the disclosed technology. In the example, a shared data center resource system reserves data center resources in time slices (e.g., every 3 minutes) and serves both transactional jobs and batch jobs where each job has a QoS specification that includes a tolerated failure probability p that the job will not be provided the data center resources it needs within the time slice. An implementation of a statistical packing algorithm (e.g., as described above) can advantageously combine these QoS probabilities with models of the job's data center resource needs in order to arrive at a reduced data center resource requirement for the group.

While specifying the probability p (e.g., of tolerated under provisioning per time slice) may be a natural QoS concern for transactional jobs, it does not directly relate to batch jobs, which may be more concerned about completion at the end than a longer time period. For such jobs, the disclosed technology involves an assumption that there is a different kind of QoS specification for these batch jobs that includes a tolerated failure probability q that the job will not be completed by the end of a time interval (e.g., after n time slices).

At 402, the implementation of the batch job QoS control algorithm (e.g., as implemented by the batch job QoS control module 214 of FIG. 2 or the batch job QoS control module 306 of FIG. 3) first involves a determination that the total data center resource needs (e.g., data center resource demand) of a given batch job is known in advance to be T, that the batch job deadline (e.g., for batch job completion) is in n time slices, and that the tolerated failure in the extended interval QoS is q.

At 404, the implementation of the batch job QoS control algorithm can determine an initial data center resource reservation S for the next time slice to be submitted with an immediate interval QoS of p, which is an input parameter chosen to be much larger than q (e.g., to facilitate the packing). In the example, the batch job QoS control module can then determine a data center resource reservation S for each time slice by finding the smallest number of failures m such that the probability of m or fewer failures is greater than or equal to the required success rate (1−q), in accordance with the following:

$$\sum_{i=0}^{m} \binom{n}{i} p^i (1-p)^{n-i} \geq 1 - q$$

At 408, the implementation of the batch job QoS control algorithm can determine a final data center resource allocation S for the time slice such that the batch job will finish even with in failures in accordance with the following:

$$S = \frac{T}{n-m}$$

Thus, in the example, the implementation of the batch job QoS control algorithm can repeat the determination of the data center resource reservation S for every time slice based on a new value of T that reflects whatever progress has been made in the preceding time slices. At 408, the batch job QoS control module can optionally adjust the data center resource reservation S based on the progress of the batch job. For example, if the batch job accumulates multiple failures to get data center resources during certain time slices, the batch job QoS control module can increase the data center resource reservation S in order to ensure completion of the batch job (e.g., in compliance with the job deadline). Alternatively, in situations where the batch job is making progress over each time slice, the batch job QoS control module can decrease the data center resource reservation S.

Such closed loop control of S can be thought of as conservative in several respects. First, when an immediate QoS fails in a particular time slice, the batch job QoS control module will generally assume that there is no progress being made on T, when in practice there will often be immediate QoS failures that involve partial data center resources being provided to the batch job. Second, by dynamically revising S, the batch job QoS control module may decrease the actual probability of failure below the probability as predicted by the formulas discussed above, which are generally accurate for an open loop execution with a single computation of S.

Exemplary Embodiments Involving an Uncertain T

The embodiments discussed above involved an assumption that T was known in advance. In general, however, implementations of the disclosed technology include a stochastic model for T. Thus, the batch job QoS control algorithm can be expanded to achieve the "extended interval" QoS even when there is uncertainty in T. For example, if a distribution of possible values of T is or can be known, the system can determine what S would be in light of the distribution.

Exemplary Embodiments Involving Feedback on T

In certain embodiments, it may be possible to instrument a batch job to provide dynamic estimates of the remaining T as the batch job executes. In such embodiments, the information can thus be included in a dynamic computation of S.

Exemplary Embodiments Involving More Precise Calculations of S

The embodiments discussed above generally assume [conservatively] that S is computed once. Better performance can be achieved when S is revised via a closed loop. The closed loop equivalent to the probability of failure is not necessarily of a closed form; rather, it can be computed via dynamic programming. This can advantageously enable implementations of a batch job QoS control algorithm to be slightly less conservative (e.g., by slightly re-adjusting S based on information pertaining to previous results), and thereby conserve more data center resources.

Exemplary Embodiments Involving Manipulations of Both S and p

The embodiments discussed above included a fixed p and an adjusted S to ensure that a batch job would be completed according to its extended interval QoS. Alternative embodiments can include a varying p in the immediate QoS. For example, the system can allocate more S (i.e., ask for a larger S) in each time slice while allowing a larger p (i.e., tolerated failure). Such implementations can thus be used to generate a parameterized family of solutions (p, S) for the immediate QoS specification. This can be beneficial in several respects.

For example, as a batch job nears the end of its extended interval, a batch job QoS control module can increase S to ensure that the job finishes. If there is an upper limit on the amount of data center resources available (or usable) in a certain time slice, then the parameterized family of solutions can facilitate decreasing p to limit the size of S required to ensure that the job finishes. Also, if a statistical packing module provides a costing on (p, S), then the batch job QoS control module can optimize the choice of (p, S) within the parameterized family of solutions. Such a "price signal" from the statistical packing module to the QoS batch control module can advantageously allow the two modules to achieve good joint optimization without needing to solve a more complex, combined optimization problem. In other words, the system can optimize against cost for the corresponding SLA.

Figure 5:
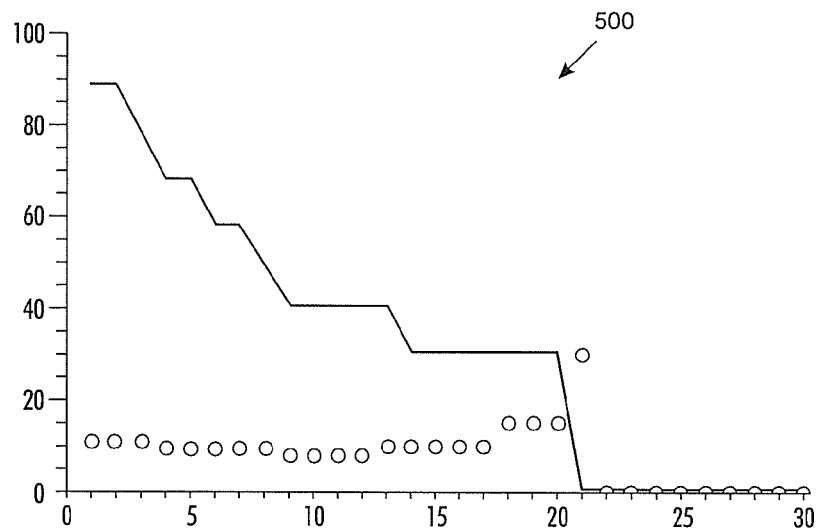
FIG. 5 is a graph illustrating a first example of adjusting a data center resource reservation S for a batch job over a period of 30 time slices in accordance with embodiments of the disclosed technology.

FIG. 5 is a graph 500 illustrating a first example of adjusting a data center resource reservation S for a batch job over a period of 30 time slices in accordance with embodiments of the disclosed technology. In the example, each dot represents a data center resource allocation S for a batch job for the corresponding time slice (i.e., along the x-axis). The solid line represents the progress of the batch job, where the data center resource needs at the first time slice is the total data center resource needs T. As the batch job progresses, the data center resource allocation S is adjusted responsive to the progress being made by the batch job. In the example, the data center resource allocation S is notably increased around the $20^{th}$ time slice because the batch job is nearing its completion deadline while not making enough progress to meet the deadline without an adjustment of the data center resource allocation S.

Figure 6:
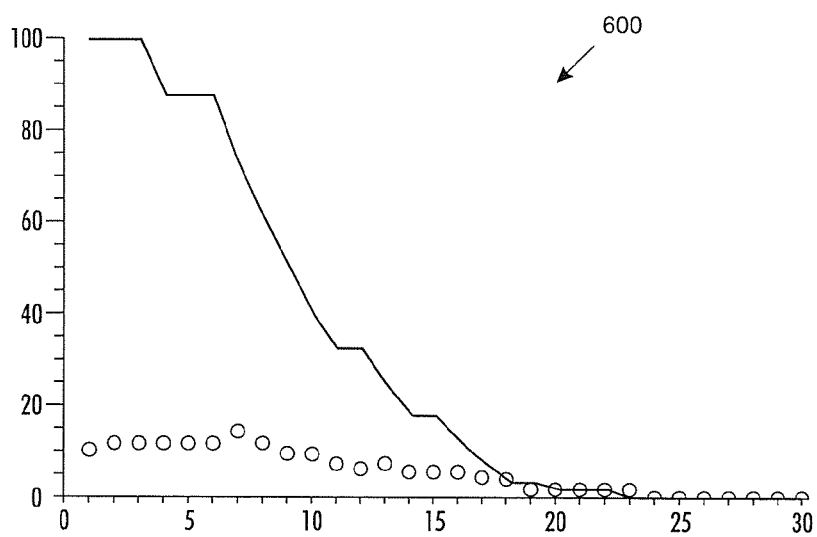
FIG. 6 is a graph illustrating a second example of adjusting a data center resource reservation S for a batch job over a period of 30 time slices in accordance with embodiments of the disclosed technology.

FIG. 6 is a graph 600 illustrating a second example of adjusting a data center resource reservation S for a batch job over a period of 30 time slices in accordance with embodiments of the disclosed technology. As with FIG. 5, each dot in the graph 600 of FIG. 6 represents a data center resource allocation S for a batch job for the corresponding time slice (i.e., along the x-axis). As the batch job progresses, the data center resource allocation S is adjusted responsive to the progress being made by the batch job. In the example, the data center resource allocation S is held fairly constant during the entire execution of the batch job as the batch job seems to be making significant progress, particularly between the $5^{th}$ and $10^{th}$ time slices.

Exemplary Machine in Which Embodiments of the Disclosed Technology May be Implemented The following discussion is intended to provide a brief, general description of a suitable machine in which certain embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, and the like.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices (e.g., keyboards and mice), as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, physical storage media.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A data center management system, comprising:
    a memory storing a data center customer profile corresponding to a data center customer, the data center customer profile comprising:
        a service level agreement (SLA); and
        a data center resource usage model; and
    a processor configured to execute:
        a batch job quality of service (QoS) control module operable to determine an immediate QoS specification for a batch job of the data center customer based at least in part on a remaining data center resource requirement that is determined at least in part by an extended interval QoS specification for the batch job and a stochastic model of data center resources needed to complete the batch job; and
        a data center resource optimization module operable to determine a data center resource allocation for the data center customer based at least in part on the data center customer profile and on the immediate QoS specification; and
        a data center customer cost determination module operable to determine a data center customer cost representing a cost to the data center of providing data center resources to the data center customer, wherein the batch job QoS control module is operable determine the immediate QoS specification for the batch job based at least in part on the data center customer cost.

2. The data center management system of claim 1, wherein the batch job QoS control module is further operable to adjust the immediate QoS specification for the batch job responsive to a progress of the batch job.

3. The data center management system of claim 2, wherein the processor is further configured to execute a data center management interface operable to alert a data center manager to the adjustment of the immediate QoS specification for the batch job.

4. The data center management system of claim 1, wherein the batch job QoS control module is further operable to determine the extended interval QoS specification for the batch job.

5. The data center management system of claim 4, wherein the batch job QoS control module is further operable to determine the remaining data center resource requirement for the data center batch job based at least in part on the extended interval QoS specification.

6. The data center management system of claim 1, wherein the batch job QoS control module is operable to determine the immediate QoS specification for the batch job by determining a data center resource reservation and a failure tolerance.

7. A machine-controlled method, comprising:
    a batch job quality of service (QoS) control module determining an immediate QoS specification for a batch job of a data center customer, wherein the data center customer has a data center customer profile comprising a service level agreement (SLA) and a data center resource usage model, wherein the immediate QoS specification is based at least in part on a remaining data center resource requirement that is determined at least in part by an extended interval QoS specification for the batch job and a stochastic model of data center resources needed to complete the batch job; and
    a data center resource optimization module determining a data center resource allocation for the data center customer based at least in part on the data center customer profile and on the immediate QoS specification; and
    a data center customer cost determination module determining a data center customer cost representing a cost to the data center of providing data center resources to the data center customer, wherein the immediate QoS specification for the batch job is based at least in part on the data center customer cost.

8. The machine-controlled method of claim 7, further comprising the batch job QoS control module adjusting the immediate QoS specification for the batch job responsive to a progress of the batch job.

9. The machine-controlled method of claim 8, further comprising a data center management interface alerting a data center manager to the adjusting of the immediate QoS specification for the batch job.

10. The machine-controlled method of claim 7, further comprising the batch job QoS control module determining the extended interval QoS specification for the batch job.

11. The machine-controlled method of claim 7, wherein determining the extended interval QoS specification comprises determining an allowed probability of failure.

12. The machine-controlled method of claim 11, wherein determining the immediate QoS specification for the batch job comprises determining a data center resource reservation and a failure tolerance.

13. The machine-controlled method of claim 12, further comprising the batch job QoS control module adjusting the data center resource reservation, the failure tolerance, or both based at least in part on a progress of the batch job and the allowed probability of failure.

\* \* \* \* \*